United States Patent [19]

Patel et al.

[11] Patent Number: 5,475,418
[45] Date of Patent: Dec. 12, 1995

[54] THERMAL IMAGING SYSTEM WITH A TRANSPARENT PINCH ROLLER

[75] Inventors: Ranjan C. Patel, Little Halingbury; Ronald G. Tye, Bishops Stortford, both of Great Britain

[73] Assignee: Minnesota Mining and Manufacturing Company, St. Paul, Minn.

[21] Appl. No.: 118,314

[22] Filed: Sep. 9, 1993

[30] Foreign Application Priority Data

Sep. 25, 1992 [GB] United Kingdom .................... 9220271

[51] Int. Cl.⁶ .................................................. F41J 2/47
[52] U.S. Cl. .......................................... 347/256; 347/262
[58] Field of Search .................................. 347/256, 262, 347/264, 241, 134, 139

[56] References Cited

U.S. PATENT DOCUMENTS

| | | |
|---|---|---|
| 4,470,055 | 9/1984 | Todoh . |
| 4,631,602 | 12/1986 | Chouinard et al. . |
| 4,698,701 | 10/1987 | Gantzhorn, Jr. et al. . |
| 4,907,103 | 3/1990 | Hiller . |
| 4,959,663 | 9/1990 | Chiba et al. . |
| 5,262,800 | 11/1993 | Smith et al. . |

FOREIGN PATENT DOCUMENTS

| | | |
|---|---|---|
| 2504016 | 8/1975 | Germany . |
| 1184820 | of 0000 | United Kingdom . |
| 1115082 | 5/1968 | United Kingdom . |

*Primary Examiner*—Mark J. Reinhart
*Attorney, Agent, or Firm*—Gary L. Griswold; Walter N. Kirn; Mark A. Litman

[57] ABSTRACT

A thermal imaging assembly for imaging a heat-sensitive material comprising:

a source of radiant or projected energy (9)

two surfaces (1,3) which co-operate to form a pinch (5), one of the two surfaces being the surface of a solid roller (1) which is transparent to the exposing radiation;

means to bias one or both surfaces against the other so as to exert a minimum pinch pressure of at least 10 g/mm², the assembly being constructed and arranged such that radiation from the source is focused at the pinch by means of the solid roller (1).

22 Claims, 1 Drawing Sheet

U.S. Patent     Dec. 12, 1995     5,475,418

THERMAL IMAGING SYSTEM WITH A TRANSPARENT PINCH ROLLER

FIELD OF THE INVENTION

This invention relates to thermal imaging systems in which heat-sensitive materials are imaged by exposure to a source of radiant or projected energy.

BACKGROUND TO THE INVENTION

Thermal imaging, where localised heating is used to image a heat-sensitive material, has found widespread acceptance in the imaging industry. Most heat-sensitive materials generally fall into two main classes:

(1) Direct imaging materials where imagewise heating of the material modifies a heat-sensitive component of the material in the heated areas, e.g., to produce a change in colour, typically from colourless to black. Because of their ability to form coloured images by the simple application of heat, such heat-sensitive materials are widely used, not only for copying books and documents, but also for recording output information from computers, facsimile apparatus, telex and other information transmission apparatus. Direct imaging materials usually consist of a single sheet.

(2) Thermal transfer materials where the desired image is formed on a receptor by the transfer of a heat-activated colourant from a donor sheet. Thermal transfer materials include both mass-transfer and diffusion-transfer materials, the latter sometimes referred to as sublimation-transfer or dye transfer materials. In each case, the donor sheet typically comprises a paper or polymeric film carrier sheet having a heat-activated, image-forming layer (referred to as the "donor layer") containing the colourant on its front or top surface. The term "colourant" is used in its broadest sense as covering any material capable of modifying the surface of the receptor, regardless of whether the modification is visible to the naked eye and would include dyes, pigments, waxes, resins etc. The colourant usually comprises one or more dyes or pigments with or without an additional binder.

Diffusion-transfer materials depend on the colourant migrating under the action of heat across the space between the donor sheet and receptor and condensing on the latter. In use, the donor sheet and receptor are assembled (but not permanently bonded) in intimate, face-to-face contact and held under pressure so that the receptor is close enough to receive the transferred colourant. The applied pressure ensures that the space separating the donor sheet and receptor remains constant, thereby ensuring that the transferred spots are of equal size. The amount of colourant transferred is proportional to the intensity of the energy absorbed, thereby giving a continuous tone image.

Mass-transfer materials depend on either the colourant layer on the donor sheet, or a suitable receptor layer on the receptor sheet, being momentarily softened or melted by the application of heat such that, on solidification, the colourant layer adheres to the receptor and remains attached thereto on separation of the donor and receptor. Unlike diffusion-transfer materials, either 0 (zero) or 100% transfer of colourant takes place depending on whether the absorbed energy exceeds a threshold value. In order to achieve high sensitivity, it is essential that the donor sheet and receptor are pressed tightly together to ensure efficient use of the heat applied.

In both direct and thermal transfer imaging systems, a thermal printhead comprising an array of miniature electrically-heated elements, each of which is capable of being activated in a timed sequence to provide the desired imagewise pattern of heating, is contacted with the heat-sensitive material. Pressure is applied to the heat-sensitive material, e.g., by a roller, to pinch the material against the heating surface of the printhead, and the printhead selectively activated to heat the material in an imagewise fashion.

In thermal transfer imaging, the image-forming layer of the donor sheet is placed in intimate contact with the surface of the receptor and the back or opposite side of the donor sheet contacted with the thermal printhead. Pressures of greater than 15 g/mm$^2$ are typically applied to the assembled donor sheet and receptor in order to pinch the sheets against the heating surface of the printhead. With some systems, pressures of up to 50 g/mm$^2$ or higher may be required for efficient colourant transfer. During imaging, the donor sheet may be exposed to temperatures of up to 300° C. or higher for short periods of time in order to effect colourant transfer.

To provide a reasonable image quality, the printheads require a high density of electrically-heated elements, which must be both accurately sized and of uniform resistance. A number of highly accurate microlithographic fabrication stages are required to achieve this. The requirement that all the elements must be functional and of uniform resistance at this level of fabrication complexity leads to a low yield. The cost of the thermal printhead is also high.

The use of thermal printheads to image thermal transfer materials is also found to provide rather poor resolution and increasing interest is being shown in the use of radiant or projected energy, especially infrared radiation, to supply the heat, thereby taking advantage of the greater commercial availability of lasers emitting in the near-infrared region of the spectrum. This is achieved by incorporating a radiation-absorber in one of the donor sheet and receptor and subjecting the assembly of donor sheet and receptor to an imagewise pattern of radiation. When the donor-receptor assembly is irradiated by radiation of an appropriate wavelength, the radiation-absorber converts the incident energy to thermal energy and transfers the heat to colourant in its immediate vicinity, causing imagewise transfer of the colourant to the receptor.

Another type of thermal imaging is the so-called Thermal Magnetic Duplication (TMD), whereby information stored on a magnetic recording member (e.g. a video type) is duplicated on a second magnetic recording member by maintaining the recording media of the respective members in face-to-face contact while the second magnetic recording medium is heated above its Curie temperature. This technology is described, for example, in U.S. Pat. Nos. 4,907,103, 4,698,701 and 4,631,602. A laser or other radiant IR source may be used to effect the heating, and by focussing it on the second magnetic recording medium, selective heating of the latter may be achieved by absorption of the radiation.

When using radiant energy to image heat sensitive materials, e.g. by means of a scanning laser, the problem arises of simultaneously applying sufficient pressure and maintaining accurate focus of the laser whilst scanning the media. Various designs of laser scanner are available, including flat-bed, internal drum and external drum scanners. Typically, these require expensive optics to keep the laser in focus, and employ vacuum hold-down to secure the media (see, for example, U.S. Pat. Nos. 5,053,791 and 5,017,547). The maximum pressure theoretically available by this means is 14.7 psi (10.3 gmm$^{-2}$), but considerably less is achieved in practice, and this is found to be insufficient for many types of thermal transfer media.

U.S. Pat. No. 4,470,055 discloses an inking drum comprising a transparent hollow roller having coated on the external surface thereof a transparent electroconductive layer and a photoconductive layer. A semiconductive ink which is solid at room temperature is coated onto the drum and a receptor sheet brought into contact with the ink layer. With a voltage applied between the ink layer and the transparent electrode, illumination from within the drum causes the photoconductive layer to switch to a low resistance state in the exposed regions generating heat which causes fusion and transferral of ink to the receptor sheet.

Our copending European Patent Application No. 90308954.8, filed 15th Aug. 1990 discloses a thermal imaging assembly comprising a transparent support shaped as a hollow drum, having coated on the external surface thereof (in order of coating) a transparent electrically conductive layer, a photoconductive layer and a second electrically conductive layer which may or may not be transparent. An inking station coats the drum with a layer of colourant containing medium, e.g., a paste or jelly impregnated with ink. In use, a receptor sheet is brought into contact with the inked drum and a voltage applied across the electroconductive layers. When exposed to light source mounted internal to the drum, the photoconductive layer switches to a low resistance state in the exposed regions, generating heat which causes transferral of colourant to the receptor sheet.

U.S. Pat. No. 4,959,663 discloses a thermal printhead comprising a transparent support bearing a photoconductive layer and electrodes for applying a voltage across the photoconductive layer. The photoconductive layer is exposed through the support using a laser intensity modulated according to image information. The change in resistance of the photoconductive layer in the exposed regions generates heat which is used to image a heat-sensitive material held against the printhead. In one embodiment, the support is formed as a cylindrical rod which focuses the laser beam onto the photoconductive layer.

In each of the aforesaid devices the exposure source is focused onto a photoconductive layer, with heat generated as a result of the current flow caused by the switch to a low resistance state in the illuminated regions.

U.S. Pat. No. 4,631,602 describes a process for replicating a magnetic pattern on to a moving flexible magnetisable recording member containng a particulate layer with chromium dioxide particles on a flexible support transparent to a beam of energy which comprises (a) passing the magnetisable recording member and a flexible prerecorded magnetisable medium through a nip of two rolls, one of said rolls being transparent to the beam of energy and facing the recording member and at least one of said rolls being compressible, the chromium dioxide particles facing said prerecorded magnetisable medium, (b) passing a continuous beam of energy through the transparent roll and the flexible support of the magnetisable recording member to simultaneously heat chromium dioxide particles across a width of the recording member on which a magnetic particle (sic-pattern?) is to be replicated for a time period in the range 0.01 to 5 milliseconds while in said nip and in contact with the prerecorded magnetisable medium, said chromium dioxide particles being heated to above their Curie temperature, (c) cooling the chromium dioxide particles to below their Curie temperature while in intimate contact with the prerecorded medium in said nip for a time period in the range from 0.1 to 100 milliseconds.

In the only embodiment described, the transparent roll takes the form of a hollow drum, the beam of energy being directed from within the drum, in which the drum exerts no focussing action on the energy beam.

This process is broadly similar to the mode of action of overhead transparency makers, in which an original bearing an IR-absorbing image and a transparent, heat-sensitive copying sheet are assembled in intimate contact and fed between two rollers, one of which is a transparent drum containing an internal radiation source. The source is typically an incandescent source rather than a laser, but again no focussing action is exerted by the drum.

British Patent No. 1184820 discloses apparatus for reading information on punched cards, sheets, tapes and the like, in which the card or other record medium is passed between two rollers, each roller comprising a cylindrical "core" extending between two end mounted discs. The end discs have a larger diameter than the core portions such that there is no contact between the core portions of the two rollers. The core portion of at least one roller is formed of a transparent material.

In use, the leading edge of the card or other record medium to be read is driven by the cooperating end discs between the space formed between the core portions of the rollers and immediately above a bank of photocells. Light from an exposure source mounted above the transparent core is focused or otherwise transmitted by the core onto the card. The pattern of light passing through the holes in the card is sensed by the photocells which produce a corresponding electrical signal.

Su-1352439 discloses a microfilm copying apparatus comprising a cylindrical lens which is biased against a drive roller by the action of two equi-sized clamping rollers. The microfilm and film are passed between the pinch formed by the lens and drive roller. Light from an exposure source mounted above the clamping rollers is focussed by the lens onto the contacted film and microfilm sheets to expose the former.

The use of cylindrical lenses as part of the collimation system for laser scanners is also known. For example, the output radiation from laser diodes is collimated with conventional lenses to produce a beam with an elliptical cross-section. A cylindrical lens is sometimes used to selectively refract one axis of the beam so that it can be focused to a circular spot which is the preferred shape for use in imaging systems.

The present invention seeks to provide an alternative method of imaging heat-sensitive materials by exposure to a source of radiant or projected energy.

SUMMARY OF THE INVENTION

According to one aspect of the present invention, there is provided a method of imaging a heat sensitive material which comprises passing the material through a pinch formed by two co-operating surfaces, the two surfaces exerting a pinch pressure of at least 10 gmm$^{-2}$ and at least one of said surfaces being the surface of a solid roller, and simultaneously exposing the material to a source of radiant or projected energy, the solid roller being transparent to the exposing radiation which is focussed at the pinch by means of the solid roller.

DESCRIPTION OF PREFERRED EMBODIMENTS

Figure 1:
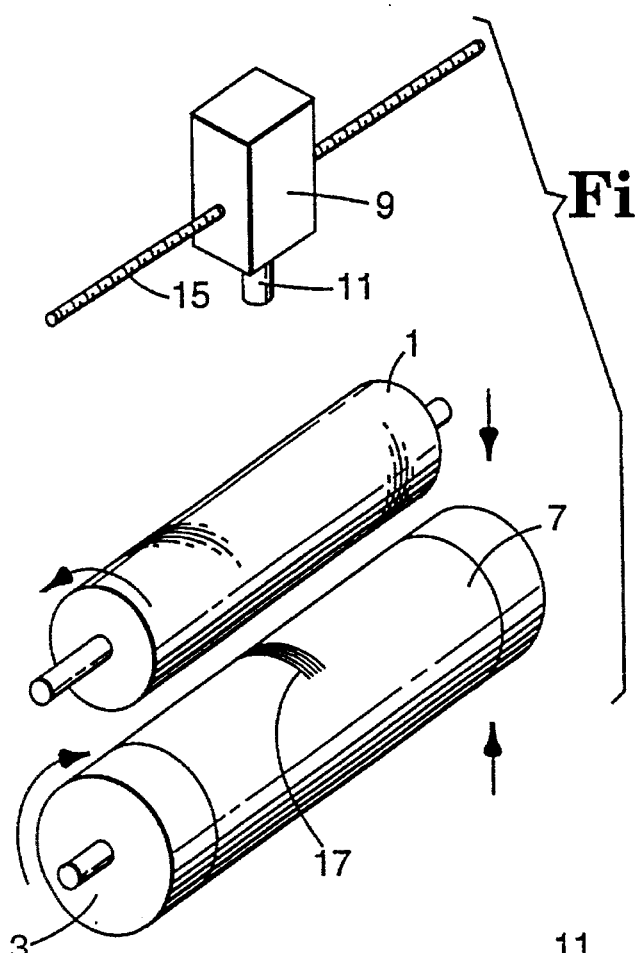
FIGS. 1 to 3 are schematic illustrations of the general principle of the invention.

Preferably, both of the co-operating surfaces are in the form of rollers. The use of two rollers is preferred, as it enables the use of higher pinch pressures and through-speeds when compared with single roller systems without significantly increasing the risk of friction damage and misregistration. For most purposes the rollers would be of cylindrical shape, although other configurations may be useful for certain applications.

The present invention describes a method for co-ordinating the movement of a heat-sensitive material, with the simultaneous application of pressure and radiant or projected energy to effect imaging of that material and which allows the imaging radiation to be focused at the very point at which maximum pressure is exerted on the heat-sensitive material. Although the thermal imaging method of the invention is suitable for use with most types of heat-sensitive material, it is particularly suitable for use with thermal transfer materials, especially mass-transfer type materials, which require the combination of pressure and imaging radiation to effect efficient colourant transfer, and for use in Thermal Magnetic Duplication. The heat required for imaging the material is derived by illumination of the material at the pinch. Heat is not generated as a result of current flow caused by the switch of a photoconductive layer to a low resistance state in the illuminated regions.

According to a further aspect of the present invention there is provided a thermal imaging assembly for imaging a heat-sensitive material comprising:

a source of radiant or projected energy;

two surfaces which co-operate to form a pinch, one of the two surfaces being the surface of a solid roller which is transparent to the exposing radiation;

means to bias one or both surfaces against the other so as to exert a minimum pinch pressure of at least 10 g/mm$^2$, the assembly being constructed and arranged such that radiation from the source is focused at the pinch by means of the solid roller.

In the context of the present invention, the term "pinch" (sometimes referred to as the "nip") is used to describe the area of contact between the two surfaces. The term "pinch pressure" is used to describe the pressure exerted by the two surfaces on the heat-sensitive material as it passes through the pinch. Thus, where the two co-operating surfaces are each in the form of a roller, the term "pinch pressure" will determine the pressure exerted by the two rollers on the heat-sensitive material as it passes through the pinch.

The term "pinch width" will be used to describe the width of pinch at the point of maximum contact in a direction transverse to the axis of the transparent roller and the term "pinch length" to describe the length of that area at the point of maximum contact in a direction parallel to the axis of the transparent roller. The pinch width is determined by the shape of the rollers, the nature of the material from which the rollers are formed, the speed of rotation of the rollers etc.

One or both of the co-operating surfaces is biased against the other to exert a minimum pinch pressure of at least 10 g/mm$^2$. The biasing means is preferably under the control of the user, to allow an appropriate pinch pressure to be selected for a given heat-sensitive material. Generally, a pinch pressure of at least 15 g/mm$^2$, preferably at least 20 g/mm$^2$ is required for efficient transfer of colourant in thermal transfer systems, with typical pinch pressures of from about 40 to 50 g/mm$^2$.

At least one of the co-operating surfaces must be the surface of a solid roller transparent to the exposing radiation. The second surface may also be formed of a transparent material to allow imaging through either one or both of the two surfaces. A second exposure source may be provided to allow simultaneous imaging through both surfaces.

The exposing radiation is collimated, adjusted to suitable beam shape and dimensions and directed to the transparent roller by means of simple conventional optics. The transparent roller itself focusses the beam to provide an illuminated area of small-but finite dimensions, typically a circular or elliptical spot or a line, at the pinch. In other words, the transparent roller acts as a cylindrical lens, and can be used to focus the exposing radiation on any given layer within the heat-sensitive material. Thus the transparent roller serves not only to create (or maintain) an area of pressure on the heat-sensitive media, but also to focus radiation at that area, and this dual action is believed to be unique.

In the majority of applications, the exposing beam is scanned along the longitudinal axis of the transparent roller, e.g. by any of the means commonly used in external drum scanners, but because of the focussing effect of the transparent roller, the optics are greatly simplified, enabling a compact, reliable low-cost apparatus to be designed. Successive scans may abut or overlap as desired. Two or more sources may scan different areas simultaneously. The output of the exposure source may be modulated in accordance with image information, or it may be continuous, depending on the application.

The transparent roller may be formed of any material having sufficient transparency to the exposing radiation. The material should be suitably wear-resistant to withstand repeated passage of heat-sensitive material through the pinch and contact (under pressure) with the second surface. The material should also be capable of withstanding the temperatures generated during thermal imaging, without deformation etc. Suitable materials include inorganic glasses, e.g., borosilicate glass, as well as synthetic resins, such as poly(methyl methacrylate) more commonly referred to by the trade name PERSPEX. Especially preferred are heat-resistant glasses, such as those commercially available under the trade name PYREX.

The pinch width is preferably larger than the diameter of the irradiating spot, or thickness of the irradiating line. This is most easily achieved by making the second surface compliant. For example, where the second surface is in the form of a roller, it may be formed of or include an outer layer comprising a compliant material, e.g., rubber, foam etc. The second surface is preferably sufficiently compliant that a pinch width of about 1 mm is produced at a pinch pressure of from 60 to 80 g/mm$^2$.

In thermal transfer imaging, a dwell time within the pinch during and after heating is preferred to ensure that transfer of colourant is complete and maximum image density is achieved. Likewise, in TMD a significant dwell time within the pinch during and after heating promotes accurate duplication of the data. Where at least one of the surfaces is in the form of a roller, the time available for thermal imaging to take place as the heat-sensitive material travels through the pinch, is dependent upon, e.g., the width of the pinch as formed by the conformation (shape) of the roller(s), the material from which the roller(s) are formed, the speed of rotation etc. Where the pinch width is substantially larger than the dimensions of the irradiating area, then the dwell time may be further increased by redirecting the irradiating area away from the centre of the pinch towards the entry point of the heat-sensitive material.

Where both of the co-operating surfaces are in the form of rollers, the two rollers may be of equal or unequal size. The latter is preferred with the transparent roller having a smaller diameter than that of the second roller. The transparent roller typically has a diameter of about 1.0–3.0 cm, although other sizes are possible.

The second surface may be used to draw the heat-sensitive material through the pinch, e.g., the second surface may comprise a conveyor or other feed system. Where the second surface is in the form of a compliant roller, it preferably has sufficient surface friction to enable it to control the drawing of the heat-sensitive material through the pinch, with the transparent roller mounted for idling movement. Alternatively, a separate feed system may be employed, independent of the two surfaces.

In principle, any heat-sensitive material may be used in the method of the invention, although thermal transfer materials are preferred. Such materials generally comprise a colourant donor sheet and a receptor which are assembled in intimate, face-to-face contact prior to imaging. The donor sheet normally comprises a support bearing a donor layer containing the colourant either with or without a binder, but may also be a self-supporting film of binder and colourant, e.g., as disclosed in our copending European Patent Application No. 91311759.2 filed 18th Dec. 1991. The receptor may be formed of any suitable material, such as paper, a plastics film etc., but it advantageously comprises a support bearing a receptor layer of a heat-softenable, usually thermoplastic, resin. A radiation-absorber (ordinarily absorbing radiation in the wavelength region 600 to 1070 nm, more usually 750 to 980 nm) must be present in one of the donor and receptor sheets, although if the colourant is itself radiation-absorbing, as disclosed in, e.g., our copending International Patent Application No. PCT/GB 92/01489 entitled "Thermal Transfer Imaging" [hereinafter referred to as "Application A"], no additional absorber may be necessary.

The radiation-absorbing material may comprise any suitable material able to absorb the radiant energy, convert it to heat energy and transfer that heat energy to the colourant. Examples of suitable radiation-absorbers include pigments, such as carbon black, e.g., as disclosed in British Patent No. 2083726, "black aluminium oxide" which is a graded mixture of aluminium and aluminium oxide, e.g., as diclosed in U.S. Pat. Nos. 4,364,995 and 4,430,366 etc., and dyes, especially infrared-absorbing dyes, including: phthalocyanine dyes, e.g., as disclosed in U.S. Pat. No. 4,547,444; ferrous complexes, e.g., as disclosed in U.S. Pat. No. 4,912, 083, squarylium dyes, e.g., as disclosed in U.S. Pat. No. 4,942,141; chalcogenopyrylo-arylidene dyes, e.g., as disclosed in U.S. Pat. No. 4,948,776; bis(chalcogenopyrylo)polymethine dyes, e.g., as disclosed in U.S. Pat. No. 4,948,777; oxyindolizine dyes, e.g., as disclosed in U.S. Pat. No. 4,948,778; bis(aminoaryl)polymethine dyes, e.g., as disclosed in U.S. Pat. No. 4,950,639; tetraarylpolymethine dyes; merocyanine dyes, e.g., as disclosed in U.S. Pat. No. 4,950,640; dyes derived from anthraquinones and naphthoquinones, e.g., as disclosed in U.S. Pat. No. 4,952,552; cyanine dyes, e.g., as disclosed in U.S. Pat. No. 4,973,572; trinuclear cyanine dyes, e.g., as disclosed in European Patent Publication No. 403933; oxonol dyes, e.g., as disclosed in European Patent Publication No. 403934; indene-bridged polymethine dyes, e.g., as disclosed in European Patent Publication No. 407744; nickel-dithiolene dye complexes, e.g., as disclosed in European Patent Publication No. 408908, and croconium dyes, e.g., as disclosed in our copending British Patent Application No. 9209047.0, filed 27th Apr. 1992.

The radiation-absorber may be present in the same layer as the colourant (as disclosed in, e.g., European Patent Publication No. 403933) or it may be present in a separate layer on the donor (as disclosed in, e.g., Japanese Patent No. 63-319191), but for many purposes it is preferable for the radiation-absorber to be situated in the receptor, e.g., in a layer between the support and receiving layer, or in the receptor layer itself, as disclosed in "Application A".

Suitable donor materials for use with receptor sheets incorporating the radiation-absorber are described in the aforesaid Application A, and include substrates coated with a layer of a vapour-deposited dye or pigment (preferably along with a controlled release layer as disclosed in U.S. Pat. No. 5,139,598) or a thin layer (<1 µm) of a binder containing a high concentration of one or more dyes.

The inclusion of the radiation-absorber in either the receptor layer or, more preferably, in an ordinarily adjacent underlayer thereto, is found to offer significant advantages over conventional thermal transfer materials in terms of both higher resolution and greater sensitivity since the heating effect is induced directly in the receptor.

The donor sheet may be of the dye-diffusion (sublimation) type, whereby colourant dyes or pigments are transferred to the receptor in an amount proportional to the intensity of radiation absorbed, but it is preferably of the mass-transfer type, whereby essentially either 0 (zero) or 100% transfer of colourant takes place, depending on whether the absorbed energy in a given area reaches a threshold value. Such materials are well-suited to half-tone imaging, and have several advantages, such as the provision of matched positive and negative images (on the donor and receptor respectively), saturated colours, and the ability to image large areas with a uniform optical density. In mass-transfer donor materials, the colourant frequently comprises one or more dyes or pigments in a waxy binder, the entire mixture being transferable.

A different type of mass transfer donor material is disclosed in Application A, in which the colourant is vapor-deposited with no binder present. The use of a vapor-deposited colourant offers significant advantages over conventional materials, in which the colourant is dissolved or dispersed in a binder, both in terms of higher resolution and greater sensitivity (speed). A vapor-deposited colourant is free from contamination by binder materials and produces a pure, more intense image on the receptor. Also the transferred image shows a highly uniform optical density, even when large areas are transferred. Such materials generally comprise a radiation-absorbing layer, ordinarily coated on a support sheet, over which the vapor-deposited colourant layer is coated. Where the colourant is itself radiation-absorbing, a separate radiation-absorbing layer may be unnecessary.

The thermal transfer donor sheets may be used in the thermal imaging assemblies of the invention in individual sheet form or in the form of a continuous roll or ribbon. If a continuous roll or ribbon is employed, the donor element may be monochrome or it may have alternating areas of different coloured colourants. For example, two, three, four and higher colour donor sheets may be prepared by using alternating areas of cyan, magenta, yellow, black and other colourants.

The imaging process may be repeated several times using the same receptor with different donor sheets, allowing full-colour images to be generated. If desired, the final image may be transferred from the original receptor to another substrate, such as paper or card stock. This transfer may be carried out by conventional thermal lamination techniques, or if the receptor support is transparent, radiation-induced transfer is possible.

In the case of mass-transfer imaging, the final desired image may be that which remains on the donor, and this may be transferred to another substrate, if desired, by conventional thermal lamination techniques, e.g., as disclosed in European Patent Publication No. 454083.

Various distinct methods are known in which radiation is used to image heat-sensitive materials and in particular to effect thermal transfer of a colourant. In a first method, a laser is scanned directly over the assembly of donor sheet and receptor. The intensity of the laser may be modulated in accordance with digitally stored image information, e.g., as disclosed in Japanese Patent No. 51-88016, U.S. Pat. No. 4,973,572, British Patent No. 1433025 and British Patent Publication No. 2083726.

Alternatively, a mask may be used to modulate exposure from a continuous, stationary exposure source, with the contacted mask and donor and receptor sheets passaged through the exposing radiation.

Although it is not intended to exclude the latter imaging method from the practice of the invention, the present invention finds greatest utility with the former method of imaging, with the exposure source being scanned along the length of the pinch formed by the co-operating surfaces.

An alternative method of contact imaging using a scanning, continuous exposure source which finds utility with the present invention is disclosed in our copending British Patent Application No. 9217095 entitled "Thermal Transfer Imaging" [hereinafter Application B]. Although it is not intended to exclude the use of direct imaging materials with this method of contact imaging, it is primarily intended for and will be described with reference to thermal transfer materials. The method comprises:

(a) assembling a donor sheet having a donor layer comprising a thermally transferable colourant, and a receptor for thermally transferred colourant so that the donor layer is in intimate contact with the receptor, one of the donor sheet and receptor comprising a radiation absorbing layer;

(b) contacting a photographic mask with the assembled donor sheet and receptor, and (c) exposing the same through the photographic mask by passage through a thermal imaging assembly of the invention. In areas defined by the transparent regions of the mask, the exposing radiation is absorbed and converted to thermal energy by the radiation-absorbing layer to effect the thermal transfer of colourant from the donor sheet to the receptor.

By suitable adjustment of various parameters, such as the power of the exposure source, spot size, scan rate and focus position, it is possible to effect thermal transfer imaging without damaging the photographic mask. The optimum exposure parameters depend on a number of variables, such as the sensitivity of the thermal transfer material and the thermal conductivity of both the mask and the radiation-absorber. The mask preferably has a thermal conductivity of at least $2\times10^{-3}$ Wcm$^{-1}$°K.$^{-1}$. The assembled donor sheet and receptor preferably constitute a system which is sufficiently sensitive to effect the transfer of colourant at energy levels of less than 4J/cm$^2$.

A further example of the use of radiation to image heat-sensitive materials, applicable to the present invention, is the so-called thermal magnetic duplication (TMD) referred to earlier wherein and described in detail in, for example, U.S. Pat. Nos. 4,907,103, 4,698,701 and 4,631,602. In this context, the magnetic recording member containing prerecorded information may be thought of as a "donor", and the blank magnetic recording member as a "receptor", although no physical transfer of matter takes place. In this case, a continuous source (normally a laser) is used without the need for a mask or any other means of modulating the output, as the "image" information is already present in the "donor". This method of duplication is normally applied to magnetic recording members in the form of tapes, typically 1.25 cm wide, and it is quite feasible for the output of a single laser to be adjusted to a a beam of this width by simple optics. Hence a static source may be used with no need for a scanning system. The thermal imaging assembly of the present invention enables further simplification in that the transparent roller automatically focusses the radiation at the point required, and eliminates the need for separate focussing optics.

The preferred exposure source is a laser, although any suitable source of radiant or projected energy may be used in the practice of the present invention. Several different kinds of laser may be used to expose heat-sensitive materials, including (but not limited to) gas ion lasers, such as argon and krypton lasers; metal vapor lasers, such as copper, gold and cadmium lasers, and solid state lasers such as ruby or YAG lasers, but in practice, diode lasers, such as gallium arsenide lasers, which offer substantial advantages in terms of their small size, low cost, stability, reliability, ruggedness and ease of modulation in accordance with digitally stored information are preferred. The exposure source preferably emits radiation in the infrared region from 600 to 1070, most preferably 750 to 980 nm, although sources emitting outside of this region may be usefully employed.

Whichever method of laser address is used, the laser preferably has a power of at least 5 mW, with the upper power limit depending on the characteristics of the mask (if used) and the thermal transfer material, as well as the scan speed and spot size. The laser is focused at the pinch to give an illuminated spot of small, but finite dimensions, which is scanned over the entire area to be imaged. Exposure of the assembly of donor sheet and receptor may be carried out from either side, i.e., through the donor carrier sheet, or through the receptor carrier sheet, providing of course that all layers through which the radiation must pass before reaching the radiation-absorber are suitably transparent.

To ensure good resolution and effective image transfer, it is essential that the donor, receptor and mask (if used) are held in intimate contact with each other during imaging. This is achieved by subjecting the assembly of mask and donor and receptor sheets to a pinch pressure of at least 10 g/mm$^2$, preferably at least 40 g/mm$^2$ and typically about 100 g/mm$^2$.

Figure 2:
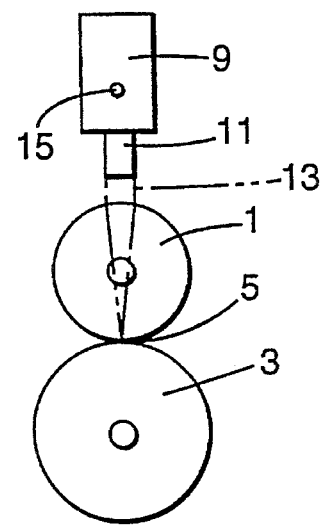
Figure 3:
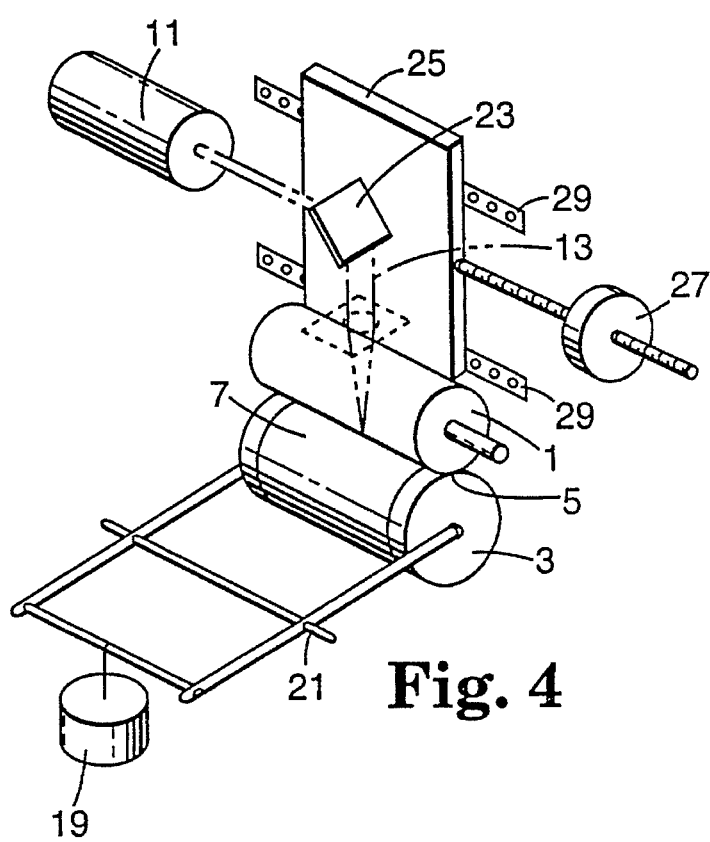
Figure 4:
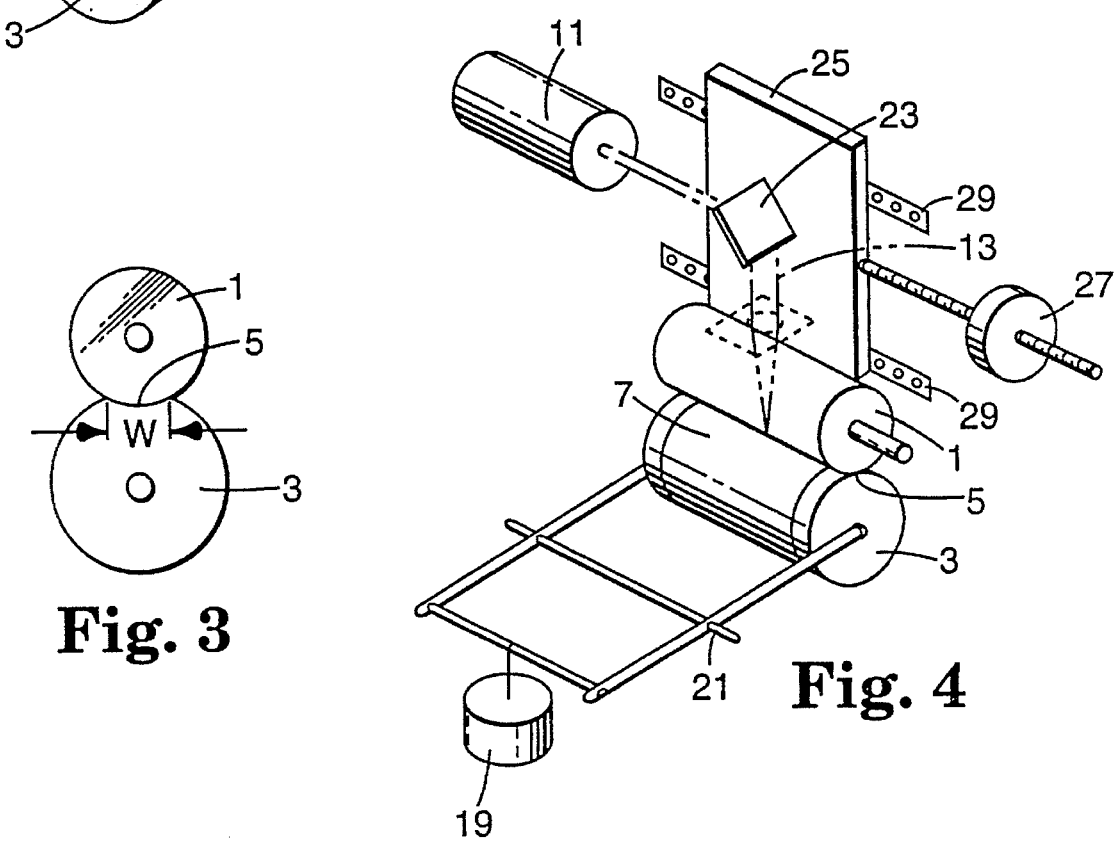
FIG. 4 is a perspective view of a thermal imaging assembly of the invention.

The present invention will now be described by way of example with reference to the accompanying drawings, in which:

FIGS. 1 to 3 schematically illustrate the general principle of the thermal imaging method of the invention, and FIG. 4 is a perspective view of a thermal imaging assembly of the invention.

FIG. 1 illustrates a preferred embodiment of thermal imaging assembly in accordance with the invention in which the two co-operating surfaces are in the form of cylindrical rollers (1 and 3) which can be brought into contact at (5) (referred to as the "pinch" or "nip") to apply pressure to a heat-sensitive material (7) passed between the rollers.

One roller (1) is transparent to allow radiation from a suitable exposure source (9), such as a laser diode, e.g., of the type commercially available from Sharp Corporation under the trade designation LTO15MD, to be focused upon the heat-sensitive material as it is drawn between the rollers (1 and 3).

The rollers (1 and 3) are ordinarily spaced in parallel planes with the heat-sensitive material passing through the pinch in a substantially horizontal direction, although any useful arrangement of rollers may be employed. The two rollers (1 and 3) may be of equal or unequal size, although the latter is preferred with the second roller (3) having a diameter greater than that of the transparent roller (1).

A lens system (11) collimates the beam (13) from the exposure source (9) to give an irradiating spot (not shown) typically an elliptical spot, at the pinch (5).

Referring to FIG. 2, the transparent roller (1) acts as a cylindrical lens by collimating the beam (13) from the exposure source (9) and focusing it at the pinch (5) between the rollers (1 and 3), typically as a circular spot which is the preferred shape for most imaging systems. In this manner, the beam (13) from the exposure source (9) can be selectively focused upon a particular layer within the heat-sensitive material, e.g., the layer incorporating the radiation-absorber in thermal transfer materials.

The second roller (3) is forced against the transparent roller (1) via a suitable biasing mechanism (not shown) to form the pinch (5). The biasing means is preferably under the control of the user, to allow an appropriate pinch pressure to be selected for a given heat-sensitive material. The biasing means preferably exerts a minimum pinch pressure of 10 g/mm².

In other embodiments (not shown), the second roller may be replaced by a conveyor or other feed system which can pass the heat-sensitive material through the pinch. The second roller may be formed of a transparent material to allow imaging through either or both rollers. A second exposure source may be provided to allow simultaneous imaging through both rollers.

It is preferred to provide a pinch width 'w' (see FIG. 3) which is substantially larger than the diameter of the irradiating spot. As the pinch width is primarily dependent on the conformation of the second roller (3) and the speed of its rotation, it is most easily increased by making the second roller (3) compliant. Accordingly, the second roller (3) may be formed of or include an outer layer comprising a compliant material. The dwell time may be further increased by focusing the irradiating spot towards the leading edge of the pinch (5).

The second roller (3) may be used to draw the heat-sensitive material through the pinch (5), with the transparent roller (1) mounted for idling movement therewith. A lateral transport system such as a screw (15) causes the laser diode and lens system (11) to scan along the length of the pinch (5), building up the image (17) on the heat-sensitive material (7) as a series of lines in a similar manner to a conventional drum-scanner.

FIG. 4 illustrates another embodiment of thermal imaging assembly in accordance with the invention, in which the second roller (3) is biased against the transparent roller (1) by a weight (19) acting through pivot (21). A mirror (23) and focusing lens (11) mounted on a support (25) directs the beam (13) from a laser diode (9) through the roller (1 and 3) onto the heat-sensitive material (7) located about the second roller (3). The transparent roller (1) acts as a cylindrical lens collimating the beam (13) from the laser diode (9) and focusing it at the pinch (5) between the rollers (1 and 3). A focussing lens (shown in dotted outline) may be provided to focus the beam (13) reflected from the mirror (23) through the transparent roller (1). A linear stepped motor drive (27) advances the support (25) along slides (29). Rotation of the second roller (3) is co-ordinated with movement of the support (25) to build up the image (not shown) as a series of lines in a similar manner to a conventional raster scanner.

"LTO15MD" (Sharp Corporation), "PERSPEX" and "PYREX" are trade names/designations.

We claim:

1. A method of imaging a heat sensitive material which comprises passing the material through a pinch formed by two co-operating surfaces, the two surfaces exerting a pinch pressure of at least 10 gmm$^{-2}$ and at least one of said surfaces being the surface of a solid roller, and simultaneously exposing the material to a source of radiant or projected energy, the solid roller being transparent to the exposing radiation which is focused at the pinch by means of the solid roller.

2. A method according to claim 1 wherein each of said surfaces is in the form of a cylindrical roller.

3. A method according to claim 2 wherein said two surfaces exert a pinch pressure of at least 20 g/mm².

4. A method according to claim 1 wherein the other of said two surfaces forming the pinch is compliant such that the width of the pinch formed by said two surfaces is about 1 mm at a pinch pressure of from 60 to 80 g/mm².

5. A method according to claim 4 wherein said exposing radiation is focused onto the material as an elliptical or circular irradiating spot and said width of the pinch formed by the two surfaces is greater than the diameter of said irradiating spot.

6. A method according to claim 5 wherein said irradiating spot is focused away from the centre of the pinch towards said material as it enters the pinch.

7. A method according to claim 1 wherein said exposure source scans along the pinch.

8. A method according to claim 1 wherein said exposure source is selected from a laser and a laser diode emitting at a wavelength of from 600 to 1070 nm.

9. A method according to claim 8 wherein the intensity of the exposure source is modulated in accordance with image information.

10. A method according to claim 1 wherein said heat-sensitive material comprises a thermal transfer donor sheet having a donor layer comprising a thermally transferable colourant, and a receptor for thermally transferred colourant.

11. A method according to claim 10 wherein said thermal transfer donor sheet is a mass-transfer material.

12. A method according to claim 1 wherein said the heat-sensitive material is contacted with a photographic mask, and the assembly of mask and heat-sensitive material is exposed through the photographic mask.

13. A method according to claim 1 wherein information stored on a first magnetic recording medium is duplicated on a second magnetic recording medium by placing said first and second magnetic recording media in face-to-face contact and passing the media through said pinch, the exposing radiation having sufficient intensity to heat the second magnetic medium above its Curie temperature.

14. A thermal imaging assembly for imaging a heat-sensitive material comprising:

a source of radiant or projected energy;

two surfaces which co-operate to form a pinch, one of the two surfaces being the surface of a solid roller which is transparent to the exposing radiation;

means to bias one or both surfaces against the other so as to exert a minimum pinch pressure of at least 10 g/mm$^2$, the assembly being constructed and arranged such that radiation from the source is focused at the pinch by means of the solid roller.

15. An assembly according claim 14 wherein each of said surfaces is in the form of a cylindrical roller.

16. An assembly according to claim 15 further comprising means to vary the pinch pressure.

17. An assembly according to claim 14 wherein the other of said two surfaces forming the pinch is compliant such that the width of the pinch formed by said two surfaces is about 1 mm at a pinch pressure of from 60 to 80 g/mm$^2$.

18. An assembly according to claim 14 wherein said exposing radiation is focused onto the material as an elliptical or circular irradiating spot and the width of the pinch formed by the two surfaces is greater than the diameter of said irradiating spot.

19. An assembly according to claim 18 wherein said spot is focused away from the centre of the pinch towards said material as it enters the pinch.

20. An assembly according to claim 14 comprising means to scan said exposure source along the pinch.

21. An assembly according to claim 14 wherein said exposure source is a laser and laser diode emitting radiation having a wavelength of from 600 to 1070 nm.

22. An assembly according to claim 21 comprising means to modulate the intensity of the exposure source in accordance with image information.

* * * * *